Figure 1:
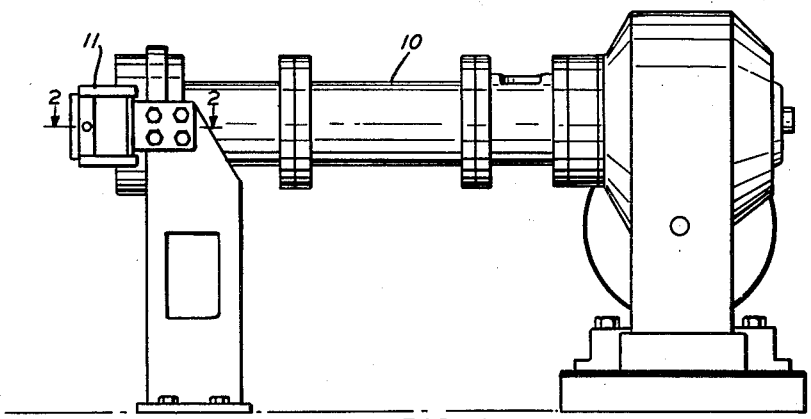

Nov. 9, 1954 E. W. WEITZEL 2,693,617
APPARATUS FOR ADVANCING AND PLASTICIZING PLASTIC COMPOUNDS
Filed May 28, 1952

INVENTOR
E. W. WEITZEL
BY
ATTORNEY

United States Patent Office 2,693,617
Patented Nov. 9, 1954

2,693,617

APPARATUS FOR ADVANCING AND PLASTICIZING PLASTIC COMPOUNDS

Edward W. Weitzel, Hickory, N. C., assignor to Western Electric Company, Incorporated, New York, N. Y., a corporation of New York Application May 28, 1952, Serial No. 290,503

4 Claims. (Cl. 18—13)

This invention relates to apparatus for advancing and plasticizing plastic compounds, and more particularly to apparatus for continuously extruding concentric coverings of plastic compounds on cores.

In the manufacture of composite extruded articles, such as for example, covered conductors, two types of extruding machines may be employed. One type is the concentric extruder in which the core tube and the die are aligned with the screw. This type is very satisfactory for extruding a single size product continuously, but does not have flexibility in the operation thereof, and the construction thereof is rather expensive.

The second type is the extruder having a T-head, in which the core to be covered is advanced transversely to the longitudinal axis of the extrusion screw, and the core tube and die are so directed. The T-type extruder has a high degree of flexibility, and it can be easily changed from extruding one type of article to extruding another type of article. However, with the T-type head, it is difficult to maintain wall thicknesses of uniform dimension completely around the core inasmuch as the compound flowing from the extrusion cylinder must take a turn of 90° before it passes through the die. Thus, in order to maintain a minimum wall thickness entirely around the core, large portions of the core must be considerably greater than that thickness.

An object of the invention is to provide new and improved apparatus for advancing and plasticizing plastic compounds.

Another object of the invention is to provide new and improved apparatus for extruding concentric coverings of plastic compounds around cores.

A further object of the invention is to provide apparatus in which plastic compounds are forced through a T-shaped extruding head along paths of substantially equal length along all portions of a core being advanced through the extruding head so that a covering concentric to the core is formed therearound.

An apparatus illustrating certain features of the invention may include an extruding cylinder and a stock screw extending along the extruding cylinder. A T-shaped extruding head is secured to the extruding cylinder and has a T-shaped passage therein, in which may be mounted a core tube and a die extending transversely to the longitudinal axis of the extruding cylinder. A stock screw extension is mounted on the end of the stock screw and projects into the extruding head, and means are provided in the extruding head for guiding compound from the extension through a 90° turn to the die along paths of substantially equal length around a core being advanced through the core tube and die.

Figure 2:
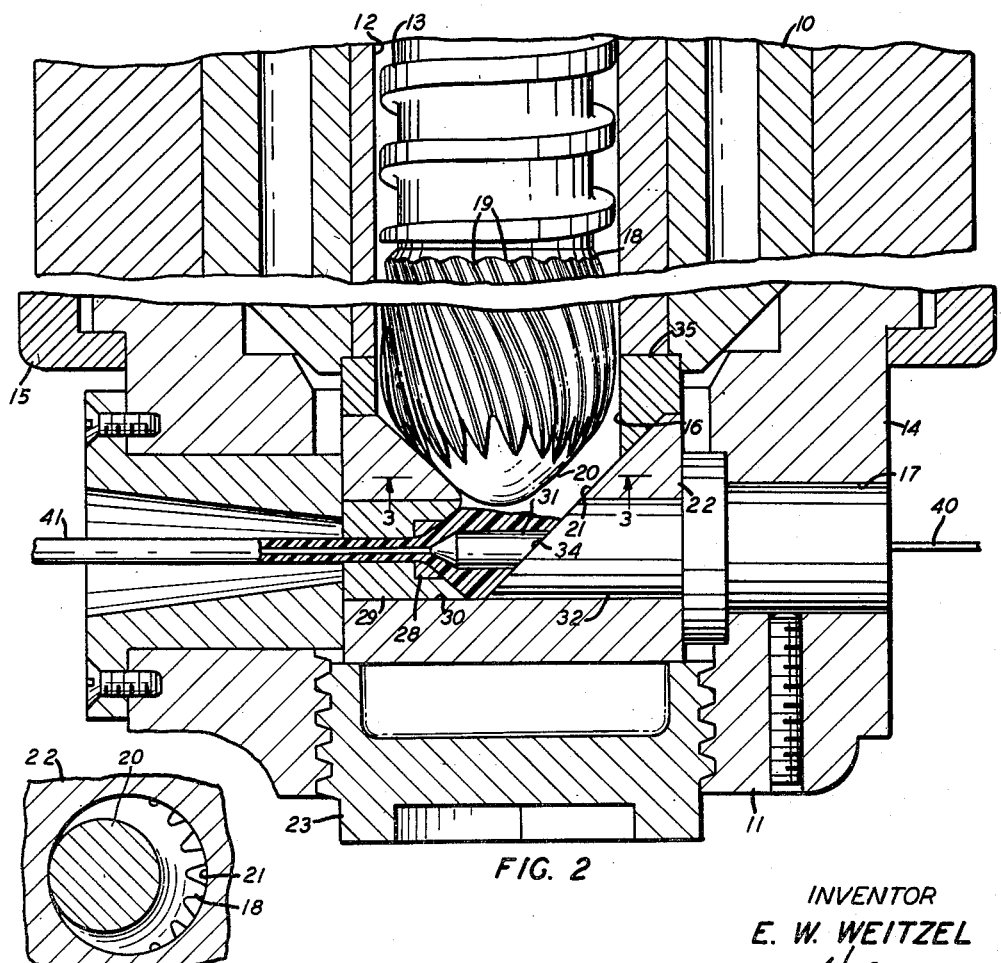
Figure 3:
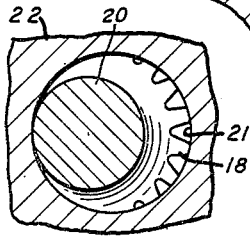

A complete understanding of the invention may be obtained from the following detailed description of an apparatus forming a specific embodiment thereof, when read in conjunction with the appended drawings, in which Fig. 1 is a side elevation of an apparatus forming one embodiment of the invention;

Fig. 2 is a fragmentary, enlarged, horizontal section taken along line 2—2 of Fig. 1, and Fig. 3 is a fragmentary, vertical section taken along line 3—3 of Fig. 2.

Referring now in detail to the drawings, there is shown therein an extruder including an extruding cylinder 10 in which a T-type extruding head 11 is secured. The extruding cylinder is provided with a bore 12 along which a plastic compound is forced by a stock screw 13 toward the extruding head 11, which includes a body portion 14 secured to the extruding cylinder 10 by a breech-type lock 15. The extruding head 11 is provided with a passage 16 aligned with the bore 12 in the extruding cylinder, and also has a passage 17 extending transversely with respect to the passage 16.

A stock screw extension 18 secured rigidly to the stock screw 13 is provided with helically extending, round ribs 19—19 and a tapered nose portion 20, which extends into a frustoconical passage 21 formed in a tool holder 22 secured in the extruding head by a breech-type lock 23. A die 28 is mounted in a die holder 29 secured in a bore 30 in the tool holder 22, and a core tube 31 carried by a core tube holder 32 also is mounted in the bore 30. The core tube holder is provided with an inclined face 34, which forms a continuation of the righthand portion of the passage 21 and serves to deflect compound toward the die 28. An adapter 35 is secured against one face of the tool holder 22.

The frustoconical passage 21 is off-center with respect to the longitudinal axis of the stock screw extension 18 so that the lefthand edge of the wall of the passage 21, as viewed in Fig. 2, is almost in contact with the lefthand portion of the nose 20 of the extension 18. This spacing, travelling around the nose, progressively increases to the righthand side of the passage 21, which is spaced substantially from the nose. The adapter bushing 35 interposed between the tool holder 22 and the extruding cylinder 10 extends the bore 12 to the offset passage 21.

Operation

A plastic compound, such as a rubber or rubber-like compound, polyethylene, a polyvinyl chloride compound, or the like, is introduced into the extruding cylinder 10 and is advanced continuously along the cylinder 10 toward the extruding head 11 and through the extruding head. Simultaneously a core 40 is advanced to the left, as viewed in Fig. 2, through the core tube holder 32, the core tube 31, the die 28 and the die holder 29. The compound is forced toward the extruding head along the extension 18, which works the compound intensely and plasticizes it. The compound enters the frustoconical passage 21 wherein it is worked severely against the lefthand wall of the frustoconical passage 21, and flows primarily to the die 28 and the core tube 31 from the righthand portion of the frustoconical passage 21, inasmuch as the righthand wall portion of the passage 21 and nose 20 of the extension are spaced rather far apart.

This has the effect of lengthening the path of the compound from the extension to the core tube and die so that the compound flows around the core tube and the core 40 and forms a completely concentric covering 41 around the core 40. Also, the effect of the eccentricity between the nose 20 of the extension 18 and the frustoconical passage 21 is to turn the compound roughly one-half the angle through which it must be turned to flow through the die 28 before the compound approaches the core tube 31 and the die 28 so that the compound turns only through 45° rather than through, in some instances, 135° if it were flowing along the lefthand wall portion of the passage 21.

The above-described apparatus serves to effectively form concentric coverings around cores and is simple in operation and construction. Conventional extruders may be adapted merely by provision of extensions similar to the extension 18, and adapters, tool holders and core tubes similar to those shown in Fig. 2.

Certain features of the above-described apparatus are disclosed and claimed in copending application Serial No. 86,085, filed April 7, 1949, by G. E. Gliss, now abandoned.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for simultaneously advancing and plasticizing plastic compounds, which comprises an extruding cylinder along which a plastic compound may be advanced, an extruding head mounted at the delivery end of the extruding cylinder and provided with a passage extending transversely of the cylinder, an extruding die mounted in the passage in the extruding head along an axis transverse to the longitudinal axis of the extruding cylinder, said extruding head having a tapered passage offset from the longitudinal axis of the cylinder and connecting the cylinder to the first-mentioned passage therein, and a stock screw extension mounted concentrically with respect to the longitudinal axis of the cylinder and having a tapered nose portion protruding into the offset tapered passage so that the clearance therein is smallest on the side nearest the die for directing the compound to the die in such a manner that concentric coverings are formed on cores advanced through the extruding die.

2. An extruder, which comprises an extruding cylinder having a bore therein along which a plastic compound may be forced, an extruding head secured to the delivery end of the extruding cylinder in communication with the bore in the extruding cylinder, a tool holder mounted in the extruding head and provided with a frustoconical passage offset from the longitudinal axis of said bore and facing the bore, said tool holder also being provided with a second passage extending transversely to the frustoconical passage therein, a die mounted in the second-mentioned passage in the tool holder, a core tube mounted in the last-mentioned passage in the tool holder, a stock screw extension provided with a frustoconical tip portion extending into the frustoconical passage in the tool holder to a position such that one side portion of the tip substantially abuts one portion of the frustoconical passage, said frustoconical passage being offset from the axis of the bore in such a manner that the maximum spacing between the tip of the extension and the wall of the frustoconical passage is spaced the farthest from the extruding die.

3. An extruder, which comprises an extruding cylinder having a bore therein along which a plastic compound may be forced, an extruding head secured to the delivery end of the extruding cylinder in communication with the bore in the extruding cylinder, a tool holder mounted in the extruding head and provided with a sharply tapered passage offset from the longitudinal axis of the bore and facing the bore, an adapter blending the tapered passage to the bore, said tool holder also being provided with a second passage extending transversely to the tapered passage therein, a die mounted in the second-mentioned passage in the tool holder, a core tube mounted in the last-mentioned passage in the extruding head in the other end of the passage, a stock screw extension mounted concentrically with respect to the bore and provided with a sharply tapered tip portion extending into the offset tapered passage in the tool holder to a position such that one side of the tip portion substantially abuts the side of the tapered passage nearest to the die and the clearance is greatest on the opposite side of said tip portion.

4. An extruder, which comprises an extruding cylinder having a bore therein along which a plastic compound may be forced, an extruding head secured to the delivery end of the extruding cylinder in communication with the bore in the extruding cylinder, a tool holder mounted in the extruding head and provided with a frustoconical passage offset from the longitudinal axis of the bore and facing the bore, said tool holder also being provided with a second passage communicating with and extending transversely to the frustoconical passage therein, a die mounted in one end of the second-mentioned passage in the tool holder, a core tube mounted in the second-mentioned passage in the tool holder between the die and the juncture of said passages, a stock screw extension provided with a plurality of helical, rounded ribs and having a frustoconical tip portion extending into the frustoconical passage in the tool holder to a position such that one side portion of the tip substantially abuts the side of the frustoconical passages nearest to the die, said frustoconical passage being offset from the axis of the bore in such a manner that the maximum spacing between the tip of the extension and the wall of the frustoconical passage is on the side of the extension opposite to the die.

References Cited in the file of this patent

UNITED STATES PATENTS

| Number | Name | Date |
| --- | --- | --- |
| 2,105,812 | Gordon et al. | Jan. 18, 1938 |
| 2,496,147 | Brillhart | Jan. 31, 1950 |
| 2,549,569 | Bradley | Apr. 17, 1951 |
| 2,556,276 | Henning | June 12, 1951 |